United States Patent [19]

Cornelius et al.

[11] Patent Number: 5,089,446
[45] Date of Patent: Feb. 18, 1992

[54] SEALING MATERIALS AND GLASSES

[75] Inventors: Lauren K. Cornelius; Gaylord L. Francis, both of Painted Post; Paul A. Tick, Corning, all of N.Y.

[73] Assignee: Corning Incorporated, Corning, N.Y.

[21] Appl. No.: 598,001

[22] Filed: Oct. 9, 1990

[51] Int. Cl.$^5$ .................... C03C 8/14; C03C 8/18; C03C 8/24; C03C 14/00

[52] U.S. Cl. ........................... 501/15; 501/17; 501/19; 501/32; 501/43

[58] Field of Search .................... 501/15, 17, 32, 43, 501/19

[56] References Cited

U.S. PATENT DOCUMENTS

| | | | |
|---|---|---|---|
| 3,258,350 | 6/1966 | Martin | 501/15 |
| 3,907,535 | 9/1975 | Muller | 501/22 |
| 3,951,669 | 4/1976 | Malmendier et al. | 501/15 |
| 4,186,023 | 1/1980 | Dumesnil | 501/15 |
| 4,238,704 | 12/1980 | Bonk et al. | 501/15 |
| 4,314,031 | 2/1982 | Sanford et al. | 501/43 |

*Primary Examiner*—Mark L. Bell
*Attorney, Agent, or Firm*—Milton M. Peterson; Clinton S. Janes, Jr.

[57] ABSTRACT

Mill additions are disclosed which lower the CTE of, and are compatible with, tin-phosphorus oxyfluoride glasses. The sealing materials provide fusion-type seals having a CTE not over about $110 \times 10^{-7}$/°C. and a sealing temperature not over about 350° C.

Also disclosed is a family of glass compositions in the tin-phosphorus oxyfluoride system that exhibit very low glass transition temperatures and coefficients of thermal expansion not over about $160 \times 10^{-7}$/°C. (25°–150° C.). In addition to the four basic elements, the glasses contain up to 11% Nb, and may additionally contain up to 10%, taken individually or in combination, of V, Fe and/or Mo to further decrease the Tg and CTE values.

45 Claims, 4 Drawing Sheets

SEALING MATERIALS AND GLASSES

RELATED APPLICATION

This application is related to U.S. patent application Ser. No. 07/594,629 entitled FUSION SEALING MATERIALS, filed of even date herewith in the name of G. L. Francis, and assigned to the same assignee as this application. The related application is concerned with sealing materials composed of lead sealing glasses together with additives to lower the effective coefficient of thermal expansion.

FIELD OF THE INVENTION

The field of the invention is fusion-type seals and sealing materials, and low transition temperature glasses adapted to use in such materials.

BACKGROUND OF THE INVENTION

In a fusion, or vitreous, type seal, the sealing material must be fused, that is, softened or melted so that it flows and wets the surface to which it is applied. A fusion sealing material may be applied to a single sealing surface, as in glazing or enameling. Alternatively, the material may be employed to join two opposed surfaces. The result is then referred to as an intermediate seal or joint. The present invention is applicable to either type of sealing operation.

Fusion sealing is a well cultivated art. In particular, numerous special sealing glasses have been developed for use in joining glass parts with each other, or with metals, alloys, or ceramics.

In making a fusion-type seal, the material must be heated to a temperature where it becomes soft enough to wet the sealing surface and form an adherent, hermetic bond. For many purposes, it is desirable to maintain the sealing temperature as low as possible. This is particularly true in electrical and electronic articles where thermally sensitive parts or coatings are commonly employed.

Accordingly, considerable attention has been given to lead glasses as low temperature sealing glasses. For example, stable sealing glasses, having softening points in the 430°-500° C. range and coefficients of thermal expansion in the $70-90\times10^{-7}$/°C. range, are disclosed in U.S. Pat. No. 2,642,633 (Dalton). Subsequent studies centered on lead zinc borate type glasses that were subject to thermal devitrification or crystallization. These glasses were intensively investigated in the search for cathode ray tube sealing materials.

Glasses having even lower transition temperature (Tg) values are disclosed in U.S. Pat. No. 4,314,031 (Sanford et al.). The transition temperature of a glass is the temperature at which the glass is deemed to be transformed from the solid to the liquid state, as determined by standard scanning calorimetry techniques. It commonly approximates the temperature-viscosity value known as the annealing point of a glass.

The glasses disclosed in the Sanford et al. patent are known as tin-phosphorus oxyfluoride glasses. They comprise, in weight percent on an elemental basis as calculated from the batch, 20-85% Sn, 2-20% P, 3-20% O, 10-36% F, the total Sn+P+O+F being at least 75%. In addition, they may contain up to 25% Pb, up to 12% Zr, up to 10% Fe, up to 3% Ti, up to 1% Ca, up to 3% Ba, up to 2% Zn, up to 12% total of Fe+Ti+Ca+Ba+Zn, up to 3% total of Na+K+Li, up to 4% Al, up to 1% Si and up to 20% total of Cl+Br+I.

The very low transition temperatures of these glasses, frequently in the vicinity of 100° C., suggested their use for low temperature sealing applications. However, use of these glasses has been severely limited by their abnormally high coefficients of thermal expansion (CTEs). Thus, the CTE values for the glasses disclosed in the Sanford et al. patent tend to be in the neighborhood of $200\times10^{-7}$/°C. Most sealing applications involve glasses, metals, or ceramics having CTE values not over about $100\times10^{-7}$/°C. These include the commonly used soda lime and borosilicate glasses, alumina ceramics and many metals and alloys.

The sealing art has recognized that high CTE values can be lowered by mill additions of materials having lower CTE values. Numerous additives have been proposed, particularly for use with the lead borate and lead zinc borate glasses. Among these are titanates, zircon and quartz. Also, crystalline materials having negative CTEs, such as beta-eucryptite, have been proposed.

In selecting a mill addition for CTE control, various other factors must also be considered. For example, it is important that the material be relatively inert. In particular, a mill addition should not react with, or dissolve in, the glass to which it is added. Not only will the CTE control be lost or modified, but such undesirable effects as bubbling, devitrification, and/or physical property changes may occur. Some additives, especially if used in large amounts, may sharply raise viscosity. This adversely affects flow characteristics during sealing.

PURPOSES OF THE INVENTION

A basic purpose is to provide an improved sealing material capable of forming a fusion seal at a sealing temperature not over 350° C.

A further purpose is to provide a mill addition for tin-phosphorus oxyfluoride glasses, such as described in U.S. Pat. No. 4,314,031, that is compatible with such glasses and capable of imparting a reduced effective CTE.

Another purpose is to provide novel glasses in the tin-phosphorus oxyfluoride system having modified compositions and lower CTE values than previously known glasses in the system.

A further purpose is to provide sealing materials based on the new glasses and adapted to sealing to materials having CTE values not over about $100\times10^{-7}$/°C.

A still further purpose is to modify the glasses of the Sanford et al. patent to render them more suitable for sealing applications.

Another purpose is to provide a sealing material capable of forming a fusion seal at a sealing temperature not over 350° C. and having an effective CTE not over $110\times10^{-7}$/°C.

SUMMARY OF THE INVENTION

One aspect of the invention is a fusion-type sealing material composed of a tin-phosphorus oxyfluoride glass having a low transition temperature and a mill addition selected from Invar, molybdenum, tungsten, lead orthophosphate and a pyrophosphate having the crystalline structure of magnesium pyrophosphate, the material after fusion having an effective CTE of not over $110\times10^{-7}$/°C. In one preferred embodiment, the glass, in weight percent on an elemental basis, comprises 20-85% Sn, 2-20% P, 3-20% O and 10-36% F. In another, the mill addition constitutes up to 20% by weight of the sealing material. In another, the material additionally contains an oxide additive, preferably stannous tin oxide, to suppress bubble formation during sealing.

Another aspect of the invention is a method of reducing the effective CTE of a Sn-P-O-F glass in a fusion seal to not over $110 \times 10^{-7}/°C$. which comprises adding to the glass a mill addition selected from Invar, molybdenum, tungsten, lead orthophosphate, or a pyrophosphate having the crystalline structure of magnesium pyrophosphate.

A further aspect of our invention resides in a family of tin-phosphorus oxyfluoride glasses comprising, in weight percent on an elemental basis as calculated from the batch, 20-85% Sn, 2-20% P, 1-11% Nb, 3-20% O, and 10-36% F, the total Sn+P+Nb+O+F being at least 75%, the glass having a Tg not over 250° C. and a CTE not over $160 \times 10^{-7}/°C$.

In addition, the glass compositions may contain one or more further cation constituents selected from up to 10%, taken individually or collectively, of Mo, Fe and/or V to further reduce Tg and/or CTE values. Primarily to enhance stability against moisture, the glasses may also contain up to 25% Pb, up to 12% Zr, up to 3% Ti, up to 1% Ca, up to 3% Ba, up to 2% Zn, the total Fe+Ti+Ca+Ba+Zn being up to 12%, up to 4% Al, up to 1% Si and up to 3% total of Na+Li+K.

A preferred range comprises 50-75% Sn, 2-11% P, 3-8% Nb, 4-13% O and 4-25% F and has a CTE below $130 \times 10^{-7}/°C$.

PRIOR ART

In addition to the Sanford et al. patent already noted, and the patent and literature references cited therein, the following U.S. patents, relating to mill additions to sealing glasses, are noted:

U.S. Pat. No. 3,258,350 (Martin) discloses the addition of up to 35% zircon to a lead borosilicate, or a lead zinc borate, glass to reduce the CTE from over $100 \times 10^{-7}/°C$. to as low as $80 \times 10^{-7}/°C$. in a fusion seal.

U.S. Pat. No. 3,907,535 (Muller) discloses adding aluminum titanate, or a negative temperature coefficient crystal, beta-eucryptite, to a thermally devitrifiable, lead borate glass to provide a material for sealing to alumina.

U.S. Pat. No. 3,951,669 (Malmendier et al.) discloses use of zinc beta-quartz solid solution as an additive to halide modified, lead borate or borosilicate glasses.

U.S. Pat. No. 4,186,023 (Dumesnil) discloses a variety of crystallized silicates and spinels as additions, in amounts up to 56% by volume, to lead borate and lead zinc borate glasses containing Cu$_2$O and F. The mixture has a sealing temperature of 360°-430° C. and a CTE as low as $50 \times 10^{-7}/°C$.

U.S. Pat. No. 4,238,704 (Bonk et al.) discloses adding cordierite to zinc silicoborate glasses to reduce the CTE in a seal.

It may be noted that none of these patents is concerned with tin-phosphorus oxyfluoride glasses. Neither do they disclose metals or phosphates as mill additions to any glass.

United Kingdom Patent No. 1,376,393 (Drake et al.) discloses increasing the flow temperature during sealing by using a mixture of glasses that react. An example is a calcium phosphate glass mixed with a lead borate glass. There is no indication of any effect on CTE.

BRIEF DESCRIPTION OF THE DRAWINGS

In the appended drawings.

GENERAL DESCRIPTION OF THE INVENTION

Figure 1:
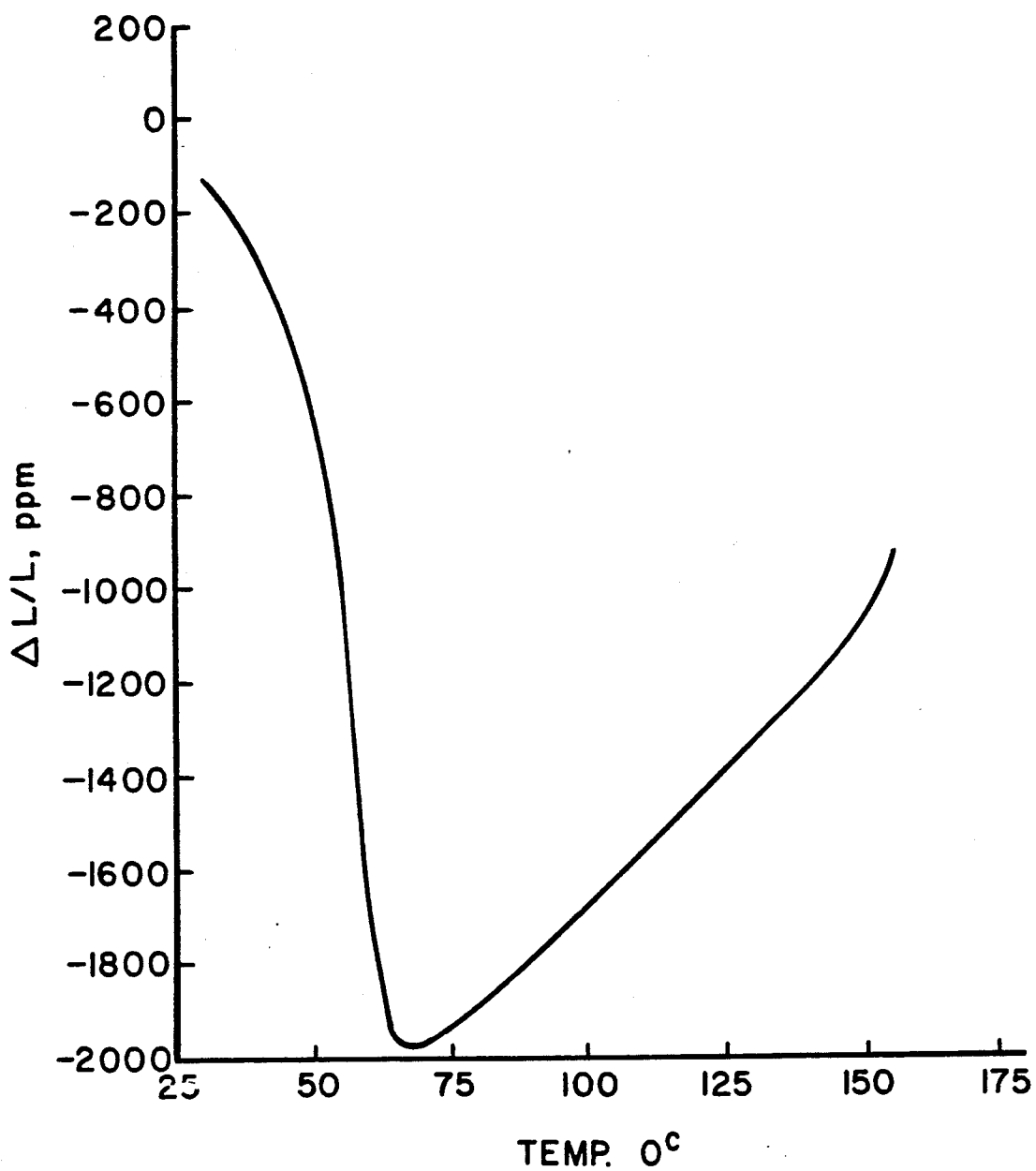
FIG. 1 is a graphical representation showing the effect of the magnesium pyrophosphate crystal inversion on the expansion curve of an oxyfluoride glass.

The present invention arose from an effort to utilize the tin-phosphorus oxyfluoride glasses of the Sanford et al. patent for sealing purposes. An outstanding virtue of these glasses is their ability to form a seal at temperatures below 350° C. In contrast, prior low temperature sealing glasses, such as the lead zinc borates, generally require sealing temperatures in the range of 400°-500° C.

The desire to utilize the low sealing temperature characteristics of the oxyfluorides was frustrated by the high CTE values that also characterized the glasses. Most glass, ceramic and metal parts, used in conjuction with vitreous seals, have CTEs not over about $100 \times 10^{-7}/°C$. Thus, the value for alumina is about 65; for soda lime glasses, in the range of 70-90; for iron-nickel-aluminum alloys about 70.

Studies designed to remedy this situation took two approaches. On the one hand, an effort was made to borrow from the known mill addition practice of the prior art. On the other hand, the effects of making additions to the composition of the basic, four-element oxyfluoride glasses were studied. Both lines have led to advantageous discoveries with respect to reduced CTE values, as well as other properties.

Additives known in the prior art include aluminum and lead titanates, cordierite, beta quartz and silica. Lead titanate was examined as a filler, but it became too viscous to seal before the stress was reduced to values below 200 psi. Low expansion silicate materials, such as cordierite and beta-quartz, caused excessive bubbling in the glass because of SiF$_4$ generated during heating. A mixture containing 10% silica in the filler also caused excessive bubbles.

At this point, a variety of materials having low CTEs were examined for compatibility with the oxyfluoride glasses. It was discovered that the nickel-iron (36-64) alloy known as Invar, as well as the metals molybdenum and tungsten, were not only compatible, but could provide a decrease in effective CTE of as much as 25 units below that of the glass alone. These metals could be added, in particulate form, in amounts up to 30% or 40% by volume before they interfered substantially with surface wetting and glass flow. However, we generally prefer to use no more than about 20% for best results in making seals.

The degree of expansion coefficient reduction thus achieved proved adequate for some purposes, but a further reduction was still desired for other sealing applications. Accordingly, the search turned to crystalline materials, either as such, or as a primary phase in glass-ceramics. This led to the discovery that certain phosphate crystal phases could be successfully incorporated in the oxyfluoride glasses. These crystalline phosphates included lead orthophosphate and alkaline earth pyrophosphates, particularly magnesium pyrophosphate. These phosphates may be used in essentially pure form, or may be obtained by thermal crystallization of glasses.

Among the possible phosphate mill additions, magnesium pyrophosphate ($Mg_2P_2O_7$) is of particular interest because it has a large negative CTE. As a result, an addition of 10% by weight of the $Mg_2P_2O_7$ to an oxyfluoride glass can impart a net negative CTE up to about 125° C. This effect appears to be caused by a large change in volume in the vicinity of 68° C., the inversion temperature of the magnesium pyrophosphate crystal.

Further studies revealed that the magnesium ion in magnesium pyrophosphate could be substituted for by various other ions. These include cobalt, arsenic, zinc, aluminum, iron and zirconium in varying amounts. However, it appears that the ion substitution does not substantially alter the magnesium pyrophosphate crystal structure. The significant feature of the ion substitution is that, in spite of the unchanged crystal structure, the inversion temperature does change. The nature and degree of change depend on both the ion substituted and the amount of the substitution. Thus, cobalt increases the inversion temperature, while the other ions decrease the inversion temperature. As a result, inversion temperatures from below 50° C. to about 300° C. can be obtained. By proper selection and combination of pyrophosphate additives then, an essentially constant effective CTE can be achieved over this range.

FIG. 1 of the appended drawing graphically represents the expansion curve for an oxyfluoride glass having an addition of 13.5% by weight of crystalline magnesium pyrophosphate. The steep dip in the curve results from the crystal inversion that occurs in the magnesium pyrophosphate crystal. The actual inversion temperature coincides with the bottom of the dip at about 68° C. However, as the curve indicates, the change occurs gradually, rather than precipitously.

Figure 2:
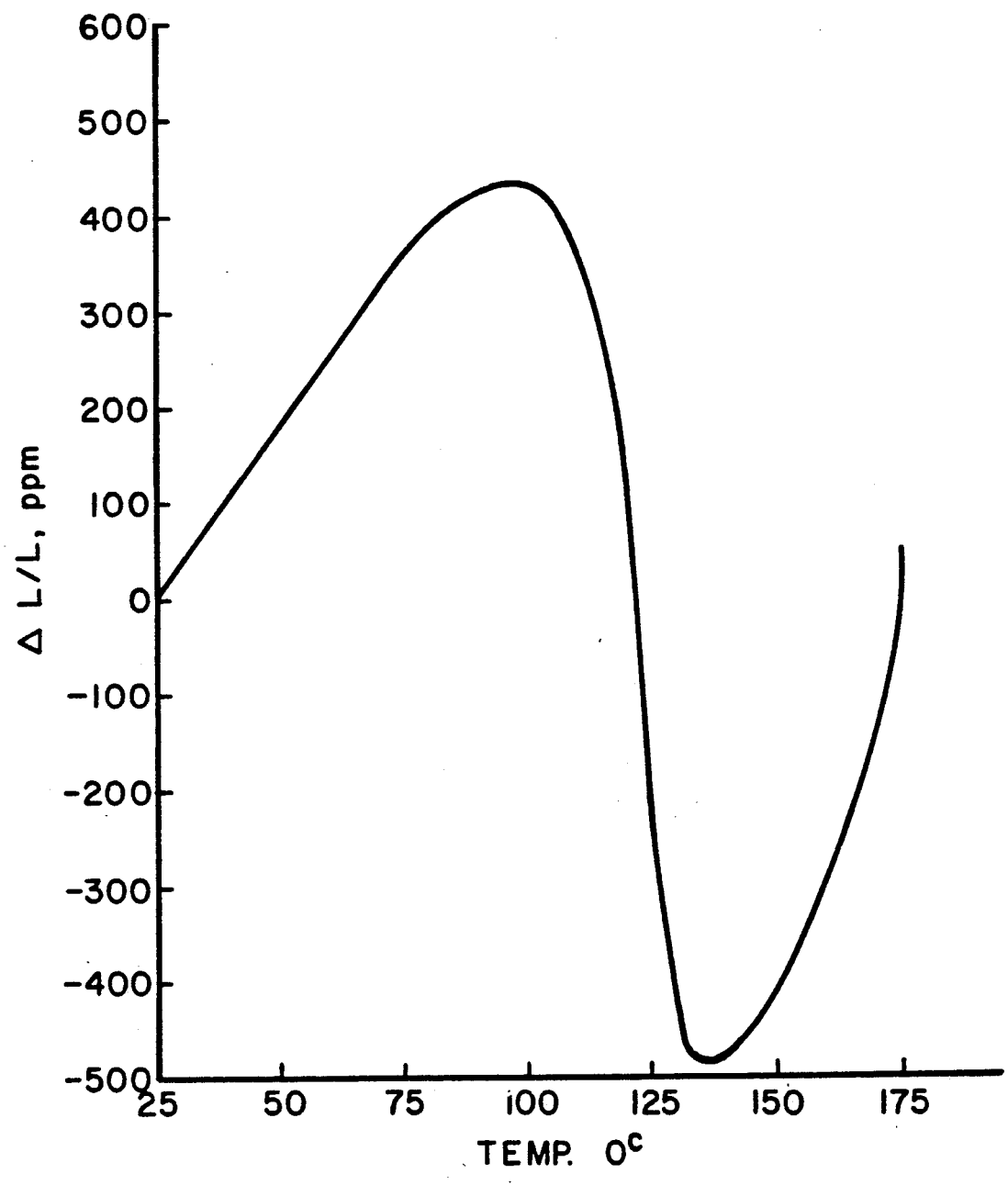
FIG. 2 is a graphical representation similar to that of FIG. 1, but showing the effect of the crystal inversion of a cobalt-ion-substituted magnesium pyrophosphate.

In the FIGURE, expansion ($\Delta L/L$), in parts per million (ppm), as measured by standard dilatometry means, is plotted on the vertical axis. Temperature, in °C., is plotted on the horizontal axis. The oxyfluoride glass composition, in weight percent on an elemental basis, was: 50.8% Sn, 8.4% P, 3.4% Pb, 6.9% Nb, 1.0% Zn, 2.2% Ba, 10.1% F and 17.1% O. The magnesium pyrophosphate approximated stoichiometric proportions, that is, about 64% $P_2O_5$ and 36% MgO in weight percent. FIG. 2 is a graphical representation similar to that of FIG. 1, but showing a different expansion curve. The data for FIG. 2 were obtained from measurements on the oxyfluoride glass of FIG. 1 having a mill addition of 13% by weight crystalline $Mg_2P_2O_7$ wherein about 32% of the magnesium ions were substituted for by cobalt ions. The substitution provided about 16% cobalt ions in the total cation (Mg+P+Co) content of the mill addition. It will be observed that the inversion occurred at a temperature of about 130° C., rather than at the 68° C. temperature with unsubstituted $Mg_2P_2O_7$.

Figure 3:
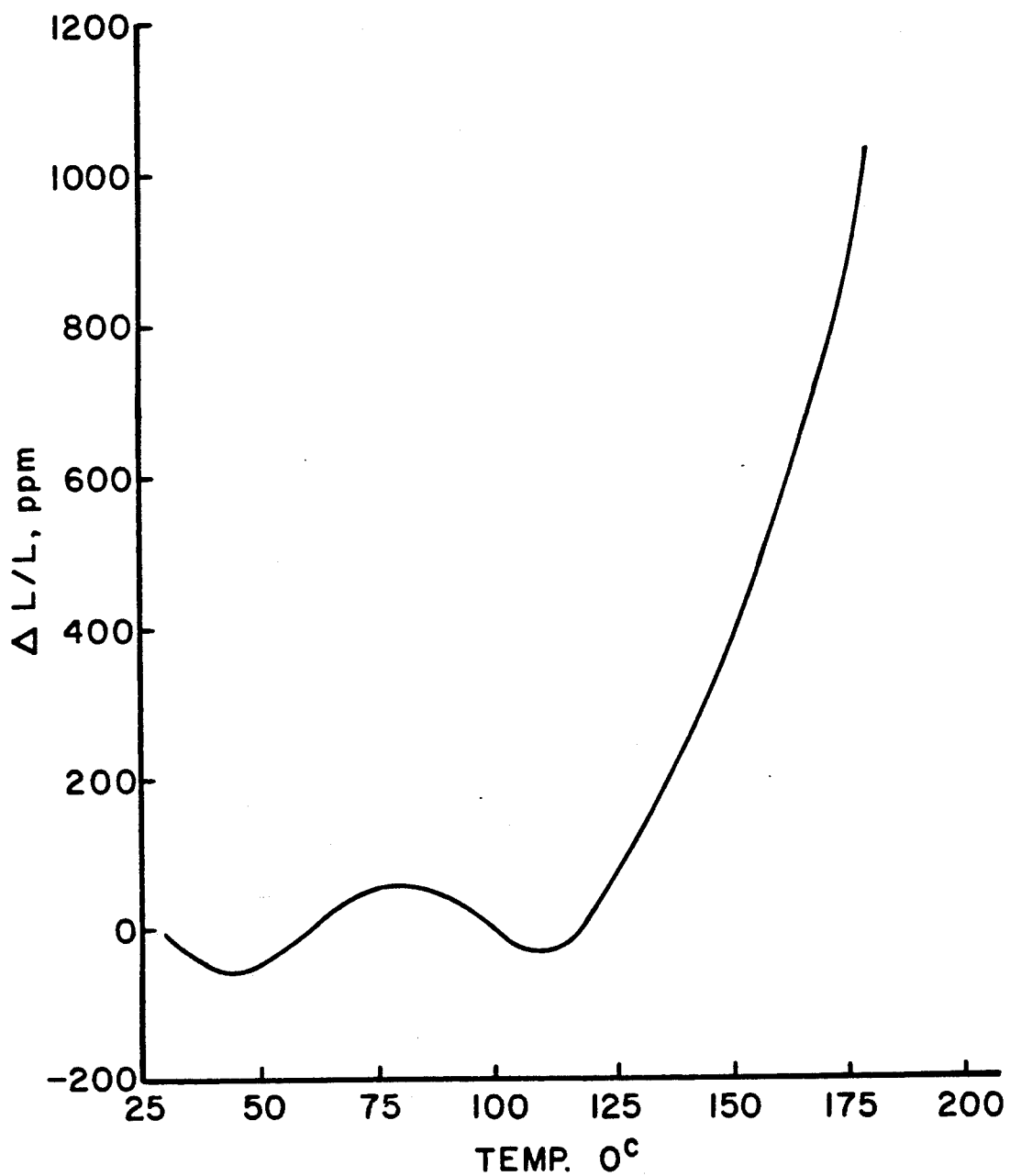
FIG. 3 is a graphical representation, also similar to FIG. 1, but showing the effect of a mixed pyrophosphate mill addition.

FIG. 3 is a graphical representation, also similar to that of FIG. 1, but showing a still different expansion curve. In this case, expansion measurements were made on the same oxyfluoride glass to which two different mill additions were made. One was 4% by weight of crystallized $Mg_2P_2O_7$ wherein about 32% of the magnesium ions (16% of the total cation content) had been substituted for by cobalt ions; the other, 4% by weight crystallized $Mg_2P_2O_7$ wherein about 8% of the magnesium ions (4% of the total cation content) had been substituted for by zinc ions. It will be observed that the zinc-ion substituted $Mg_2P_2O_7$ has imparted an inversion at a temperature of about 45° C., while the cobalt-ion-substituted $Mg_2P_2O_7$ has imparted an inversion at a temperature of about 120° C. It is apparent that, by proper selection of ion substituted mill additions, the effective CTE may be controlled over a wide temperature range.

Figure 4:
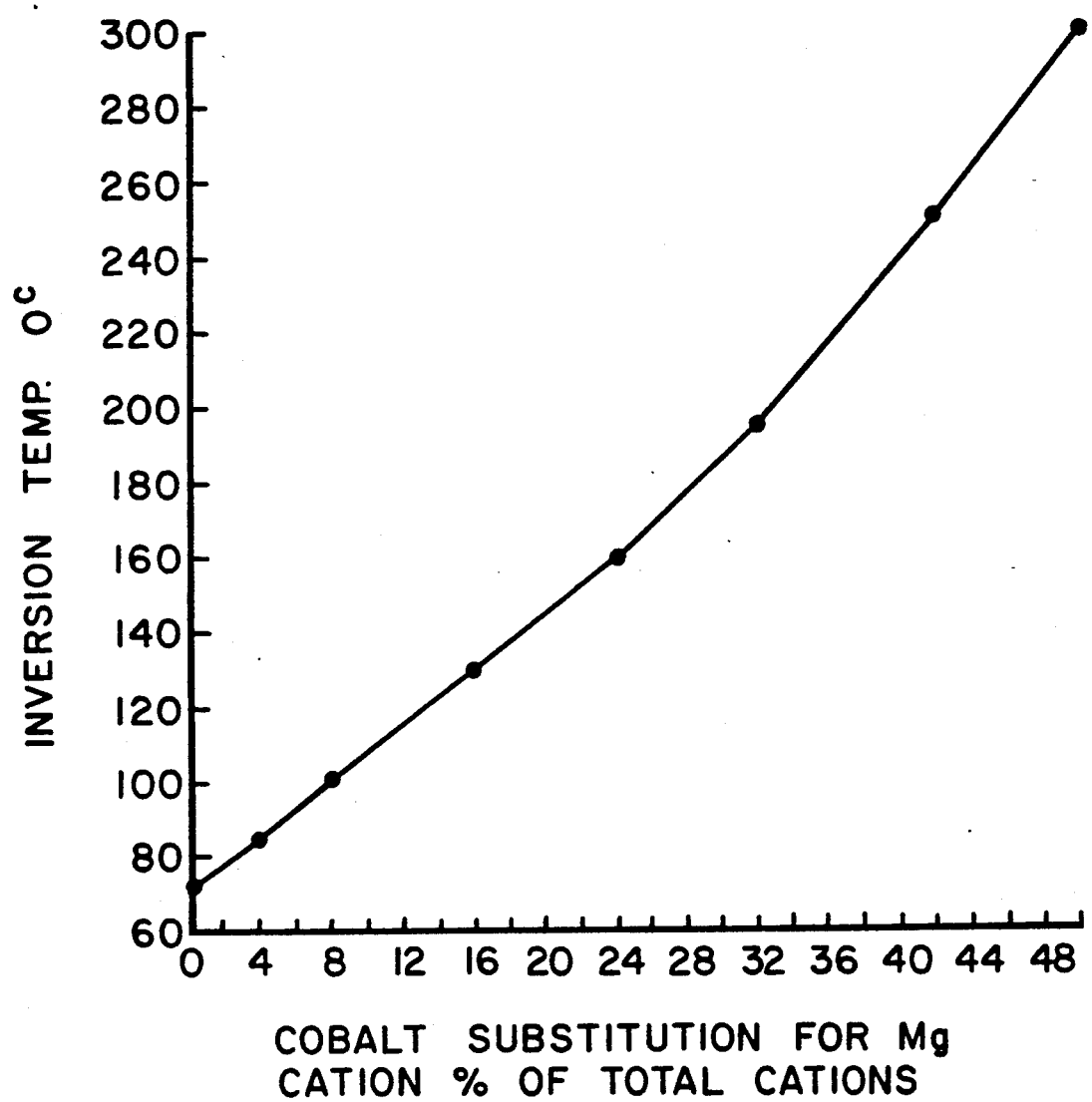
FIG. 4 is a graphical representation showing the progressive effect of cobalt ion substitution on magnesium pyrophosphate inversion temperature.

FIG. 4 is a graphical representation showing the manner in which the inversion temperature of crystalline $Mg_2P_2O_7$ increases as cobalt ions progessively are substituted for magnesium cations. In FIG. 4, the inversion temperature, in °C., is plotted on the vertical axis, while cobalt ion content, as percent of total cation content (Mg+Co+P), is plotted on the horizontal axis.

The pyrophosphates are of particular interest as mill additions because stress in a seal can be lowered to zero, and even beyond to create tension, by increasing the amount of the addition. Microcracking can occur in the seal, but this is believed to be related to the presence of larger particles of the phosphate. The cracking can be solved by either fine grinding, or by classification of the powder. This remedy is limited by a greater tendency for fine materials to dissolve during the sealing process. Also, when the average particle size of the crystallized mill addition falls below about 15 microns, the crystal inversion tends not to occur, or is ineffective.

Further study showed that the presence of Invar in a phosphate mill addition also alleviated the cracking problem. Accordingly, a preferred mill addition is a combination of Invar powder and a fine phosphate addition. As indicated above, substantial amounts of Invar may be added, but we prefer to use no more than about 20%.

It was noted earlier that certain conventional fillers tended to cause bubble formation at a seal interface. This was particularly true when forming a seal with a silicate glass surface. While the problem is not as serious with the present phosphate additives, it still persists.

Analysis indicated that the bubbles contained $SiF_4$ gas, which was presumably generated from a reaction of the oxyfluoride and silicate glasses. Many known types of barrier coatings were tested and found to be ineffective, or cumbersome to use. It was found, however, that the tendency for bubbles to form could be reduced, and substantially eliminated, by including certain oxides in the mill addition. The materials that were most effective were $Pb_3O_4$, PbO, $Bi_2O_3$, $Sb_2O_5$, ZnO, CdO, and stannous tin oxide (SnO). SnO was the most efficient additive in concentrations as low as 1% by weight, but was less effective when relative concentrations of $SnF_2$ to SnO were too high in the matrix glass. The mechanism by which SnO was so effective in reducing the bubble formation is not known.

The glass composition aspect of the present invention is basically an extension of, or improvement on, the tin-phosphorus oxyfluoride glass family disclosed in the Sanford et al. patent. The compositions there disclosed are essentially constituted of the four indicated elements. In addition, the patent teaches that up to 25% of various other elements, such as alkaline earth metals, lead and aluminum, may be present, primarily to stabilize the glass. The possibility of including most other known elements is contemplated, but no particular feature, or purpose, or exemplary composition is taught.

The tin-phosphorus oxyfluoride glasses are characterized by very low glass transition temperature (Tg) values, frequently as low as about 100° C. This characteristic, together with electrical resistivity values of $10^7$–$10^{11}$ ohm-cms., make these glasses candidates for hermetic sealing applications at low temperatures not over about 350° C. However, this potential use has been limited by very high CTE values on the order of $200 \times 10^{-7}$/°C.

Studies, based on making additions to the basic, four-element oxyfluoride compositions, revealed that the CTE value of a basic tin-phosphorus oxyfluoride glass could be substantially reduced by incorporating up to about 11% by weight of Nb in the glass composition. Thus, values of about $150 \times 10^{-7}$/°C. may be obtained. Larger amounts of niobium tend to stiffen the glass and create a tendency for phase separation. In the interest of a homogeneous glass, we prefer lead niobate as a niobium source.

Both the CTE and Tg values may be further reduced by including, as an additional glass constituent, up to 10% of at least one element selected from Mo, Fe and/or V. By combining one or more of these elements with niobium in a basic glass, CTE values approaching $100 \times 10^{-7}$/°C. and Tg values of 100°–150° C. may be obtained.

SPECIFIC EXAMPLES

The invention is further illustrated by reference to several specific examples of sealing materials based on oxyfluoride glasses, and to novel, oxyfluoride glass compositions in accordance with the invention.

In formulating glass batches, from which to melt the present glasses, fluorides, oxides and phosphates were employed. Commercial purity materials were used, except for reagent grade ammonium acid phosphate and 99.9% pure SnO and $PbF_2$. The glass batches, thus formulated, were melted in vitreous carbon or nickel crucibles at temperatures in the range of 550°–650° C., and for times of one to four hours depending on batch size.

Each glass melt was cast in both bar and patty forms for property measurements. CTE values were measured by dilatometry methods. Tg values, the temperatures at which glasses are transformed from the solid to the liquid state, were determined by standard scanning calorimetry techniques. The Tg of a glass approximates the annealing temperature, a viscosity-temperature relationship.

TABLE IA, below, sets forth batch compositions, in parts by weight, for a series of glasses containing niobium (Nb) in accordance with the invention. TABLE IB sets forth the glass compositions, in parts by weight, on an elemental basis. Since the glass compositions approximate 100, the data may be taken as percents. Glass appearance and measured properties are also recorded for each glass.

TABLE IA

| Material | 1 | 2 | 3 | 4 | 5 | 6 | 7 | 8 |
|---|---|---|---|---|---|---|---|---|
| $SnF_2$ | 5.1 | 5.7 | 5.6 | 16.4 | 10.4 | 13.0 | 13.8 | 15.2 |
| SnO | 2.6 | 2.3 | 2.2 | — | 5.1 | 6.3 | 14.0 | 16.0 |
| $PbF_2$ | 1.2 | 0.4 | 1.2 | 1.0 | 1.0 | — | 2.0 | 2.0 |
| $NH_4H_2PO_4$ | 3.9 | 3.8 | 3.9 | 7.6 | 7.6 | 10.1 | 16.9 | 14.2 |
| $Nb_2O_5$ | 0.9 | 1.2 | 1.2 | 2.4 | 2.4 | 3.0 | 4.8 | 4.8 |
| $ZnF_2$ | — | 0.2 | — | 0.4 | 0.4 | 0.5 | 0.8 | 0.8 |
| $BaF_2$ | 0.4 | 0.3 | — | 0.7 | 0.7 | 0.9 | 1.4 | 1.4 |

| Material | 9 | 10 | 11 | 12 | 13 | 14 | 15 | 16 |
|---|---|---|---|---|---|---|---|---|
| $SnF_2$ | 10.4 | 15.7 | 15.7 | 15.7 | 10.4 | 10.4 | 10.4 | 10.4 |
| SnO | 5.1 | 15.6 | 15.6 | 14.6 | 5.1 | 5.1 | 5.1 | 5.1 |
| $PbF_2$ | 1.0 | — | — | — | — | 0.25 | — | 1.0 |
| $NH_4H_2PO_4$ | 7.6 | 14.2 | 15.1 | 15.1 | 7.6 | 7.6 | 7.6 | 7.6 |
| $Nb_2O_5$ | 2.4 | 4.8 | 4.8 | 4.8 | 2.4 | 2.4 | 2.4 | 2.4 |
| $MoO_3$ | 1.2 | 1.2 | — | — | — | — | — | — |
| $PbMoO_4$ | — | — | 5.9 | 5.9 | — | — | — | — |
| $V_2O_5$ | — | — | — | 0.7 | — | — | 1.1 | — |
| $FeF_3$ | — | — | — | — | 1.2 | 1.35 | — | — |
| $WO_3$ | — | — | — | — | — | — | — | 1.9 |
| $ZnF_2$ | — | 0.8 | — | — | — | — | — | — |
| $BaF_2$ | — | 1.4 | — | — | — | — | — | — |

TABLE IB

| Element | 1 | 2 | 3 | 4 | 5 | 6 | 7 | 8 |
|---|---|---|---|---|---|---|---|---|
| Sn | 48.8 | 51.0 | 49.0 | 48.4 | 50.0 | 51.4 | 48.5 | 52.4 |
| P | 8.3 | 8.2 | 8.4 | 8.0 | 8.3 | 9.1 | 9.7 | 7.8 |
| Nb | 5.0 | 6.7 | 6.7 | 6.6 | 6.8 | 7.0 | 7.1 | 6.9 |
| Pb | 8.0 | 2.7 | 8.0 | 3.4 | 3.4 | 0 | 3.6 | 3.5 |
| Zn | 0 | 1.0 | 0 | 1.0 | 1.0 | 1.1 | 1.1 | 1.0 |
| Ba | 2.5 | 1.9 | 0 | 2.1 | 2.2 | 2.3 | 2.3 | 2.2 |
| O | 15.4 | 16.1 | 15.7 | 13.8 | 16.05 | 17.2 | 19.1 | 16.9 |
| F | 12.0 | 12.3 | 12.3 | 16.7 | 12.0 | 11.8 | 8.6 | 9.4 |
| Appearance | clear amber | clear amber | clear yellow | clear yellow | clear yellow | clear yellow | hazy yellow | hazy yellow |
| Tg | 155 | — | — | 149 | 177 | — | 220 | 195 |
| Tx | — | — | — | 368 | 395 | — | 325 | 360 |
| CTE | 167 | 130 | 150 | 152 | 135 | 130 | 122 | 126 |

| ELEMENT | 9 | 10 | 11 | 12 | 13 | 14 | 15 | 16 |
|---|---|---|---|---|---|---|---|---|
| Sn | 49.9 | 53.1 | 49.9 | 48.6 | 51.5 | 51.7 | 52.2 | 48.5 |
| P | 8.3 | 7.9 | 7.9 | 8.0 | 8.5 | 8.6 | 8.7 | 8.0 |
| Nb | 6.7 | 6.9 | 6.5 | 6.6 | 7.0 | 7.0 | 7.1 | 6.6 |
| Pb | 3.4 | 0 | 6.5 | 6.5 | 0.9 | 0 | 0 | 3.3 |
| Zn | 0 | 1.0 | 0 | 0 | 0 | 0 | 0 | 0 |
| Ba | 0 | 2.3 | 0 | 0 | 0 | 0 | 0 | 0 |
| Mo | 3.2 | 1.7 | 3.0 | 3.0 | 0 | 0 | 0 | 0 |
| V | 0 | 0 | 0 | 0.8 | 0 | 0 | 2.6 | 0 |
| Fe | 0 | 0 | 0 | 0 | 2.5 | 2.8 | 0 | 0 |
| W | 0 | 0 | 0 | 0 | 0 | 0 | 0 | 5.9 |
| F | 10.8 | 9.1 | 7.4 | 7.5 | 13.2 | 13.4 | 10.7 | 10.5 |
| O | 17.6 | 18.0 | 18.7 | 19.0 | 16.5 | 16.6 | 18.8 | 17.1 |
| Appearance | black | black | black | black | reddish | reddish | black | black |
| Tg | — | 180 | 182 | 178 | 158 | 160 | 162 | 187 |

TABLE IB-continued

| Tx  | —   | 362 | 362 | 350 | 350 | 355 | 312 | 345 |
| --- | --- | --- | --- | --- | --- | --- | --- | --- |
| CTE | 112 | 118 | 110 | 106 | 106 | 103 | 106 | 103 |

By way of further illustrating the changes effected by the present inventive glass composition modifications, a composition of five basic elements was formulated, batched, melted, and the properties of the resulting glass measured. The glass batch, in parts by weight, was: 17.4 $SnF_2$, 6.0 SnO, 10.8 $NH_4H_2PO_4$, 4.4 $PbF_2$. The elemental analysis, calculated in parts by weight, was: 50.3% Sn, 7.9% P, 10.0% Pb, 18.2% O, and 13.6% F. Measured properties included a Tg of 110° C. and CTE of $200 \times 10^{-7}$/°C.

A sample of this glass, as well as samples of glasses having the compositions of Examples 1,2 and 3 of TABLE 1B, above, were compared for durability against moisture. Durability was measured by subjecting the glasses to 98% relative humidity at 50° C. After three days, attack on the base glass was visually apparent, and treatment of the sample was discontinued. The glasses of Examples 1,2 and 3 were continued on test in the humidity chamber for three weeks. At the end of that time, they showed a slight iridescence, but no apparent surface attack.

In the course of developing the invention, three different tin-phosphorus oxyfluoride glasses were used as base glasses. TABLE II below sets forth the composition of these glasses, in mol percent, together with their relevant properties. In the TABLE, Tg denotes glass transition temperature in °C.; Tx denotes sealing temperature in °C.; CTE denotes coefficient of thermal expansion multiplied by $10^{-7}$/°C.

TABLE II

|          | 1    | 2   | 3    |
| -------- | ---- | --- | ---- |
| $SnF_2$  | 26.8 | 25  | 21.1 |
| SnO      | 25.2 | 27  | 17.7 |
| $PbF_2$  | 2.0  | —   | 11.5 |
| $P_2O_5$ | 33.0 | 33  | 49.7 |
| $Nb_2O_5$| 9.0  | 9   | —    |
| $ZnF_2$  | 2.0  | —   | —    |
| $BaF_2$  | 2.0  | —   | —    |
| $PbMoO_4$| —    | 4   | —    |
| $V_2O_5$ | —    | 2   | —    |
| Tg(°C.)  | 198  | 178 | 160  |
| Tx(°C.)  | 350  | 350 | —    |
| CTE      | 125  | 109 | 209  |

A batch was prepared on the basis of each composition. The indicated materials were employed, except that $P_2O_5$ was supplied by $NH_4H_2PO_4$. Each batch was melted at 600° C. in air. Either a vitreous carbon, or a nickel, crucible was employed. The glass melt was cast as a patty, and crushed after cooling.

The crushed glass was mixed with a selected filler, and the mixture ground with a mortar and pestle. Lead orthophosphate ($5PbO.P_2O_5$) was prepared by heating $3PbO.P_2O_5$ powder slowly to 950° C., holding there for 12 hours, and furnace cooling. The $3PbO.P_2O_5$ was made by mixing 80.16 gms of $PbCO_3$ with 26.42 gms of $(NH_4)_2HPO_4$ in acetate, drying overnight, calcining at 200° C. for 1 hour, firing in a covered silica crucible for 8 hours at 950° C. with a 8 hour rise time and a furnace cool down. In both of the previous cases, the phase was identified by x-rays. Invar was used as a −325 mesh powder commercially available.

TABLE III, below, sets forth compositions, calculated in percent by weight on an oxide basis, for several thermally crystallized, phosphate glasses prepared for use as fillers.

TABLE III

| Oxide     | A  | B    | C    | D    | E    |
| --------- | -- | ---- | ---- | ---- | ---- |
| MgO       | 30 | 35.8 | 41.5 | 22.1 | 32.3 |
| $Al_2O_3$ | 1  | 1    | 1    | —    | —    |
| $P_2O_5$  | 69 | 63.2 | 57.5 | 57.1 | 61.9 |
| $Co_3O_4$ | —  | —    | —    | 20.7 | —    |
| ZnO       | —  | —    | —    | —    | 5.7  |

Glass batches, based on these compositions, were prepared by blending other oxide ingredients into phosphoric acid ($H_3PO_4$) in a platinum crucible. The batch was then calcined at 440° C., after which the crucible was placed in a furnace at 1500° C. for two hours to melt the batch. The melts were poured into molds to prepare 4"×8" patties that crystallized as they were cooled to about 500° C., at which temperature they were annealed. A portion of the crystallized glass was pulverized for use as a filler.

Test bars for CTE measurements were made from numerous combinations of oxyfluoride glasses and filler additions, including compositions A,B and C of TABLE III. To make a body for CTE testing, a portion of the sealing ingredients was placed in a metal die. The die was then heated to 310° C. and a pressure of about 200 psi applied to the materials. The resulting compressed body was cooled in the die to around 140° C. and then removed. The body was then ground to 1"×¼"×¼" dimensions for CTE measurements.

In each case, the filler was added in an amount of about 17 volume percent. TABLE IV records the glasses, identified as in TABLE II; the fillers, as identified in TABLE III; the weight percent equivalent for each filler; and the average CTE times $10^{-7}$/°C., as measured over the temperature range of 25° to 150° C.

TABLE IV

|   | Glass Filler   | (Wt. %) | CTE × $10^{-7}$ |
|---|----------------|---------|-----------------|
| 1 | none           |         | 125.5           |
| 1 | Invar          | 28.6    | 99.9            |
| 1 | $5PbO.2P_2O_5$ | 26.0    | 101.0           |
| 1 | $3PbO.P_2O_5$  | 26.0    | 114.4           |
| 1 | ExA            | 11.9    | 76.3            |
| 1 | ExB            | 11.9    | −160.2          |
| 1 | ExC            | 11.9    | 96.3            |
| 2 | None           |         | 109.0           |
| 2 | Invar          | 28.6    | 88.6            |
| 2 | $5PbO.2P_2O_5$ | 26.0    | 94.8            |
| 2 | ExA            | 11.9    | 36.3            |
| 3 | None           |         | 209.0           |
| 3 | Invar          | 28.6    | 185.0           |
| 3 | $5PbO.2P_2O_5$ | 26.0    | 101.0           |
| 3 | ExA            | 11.9    | 40.9            |

From Table IV, it is obvious that both Invar and $5PbO.P_2O_5$ can be used to lower the expansion coefficient of the oxyfluoride glasses by about $25 \times 10^{-7}$/°C. units. $3PbO.P_2O_5$ indicated low expansion when stress measurements were made; however, it is thought that the high CTE value in Table IV was the result of the filler dissolving in the glass due to the longer time involved for the molding of the CTE sample versus the stress sample.

These fillers are of considerable interest where sealing materials having CTE values on the order of 70 to $100 \times 10^{-7}/°C$. are required. However, the crystalline filler, obtained from a melt of composition B in TABLE III, obviously has a much greater potential range.

X-ray analysis of the composition B material, after thermal crystallization, shows that it is almost completely a magnesium pyrophosphate ($Mg_2P_2O_7$) crystal phase. The oxide proportions closely correspond to the stoichiometric, 2:1 molar ratio of $Mg_2P_2O_7$, thus confirming the essential purity of the material.

The materials obtained by thermally crystallizing the melts from Compositions A and C of TABLE III also show a magnesium pyrophosphate crystal phase. However, the non-stoichiometric ratio of MgO to $P_2O_5$ in these compositions leads to other crystal and/or glass phases. This appears to impede the effect of the pyrophosphate, and to create the erratic effects noted. Accordingly, in producing a magnesium pyrophosphate type filler, it is desirable to adhere closely to a stoichiometric ratio, as in compositions B, D and E.

The large negative CTE, for the sealing material utilizing the filler having Composition B, is thought to be occasioned by a dramatic inversion in the magnesium pyrophosphate crystal at about 68° C. This effect is illustrated in FIG. 1 of the drawings wherein the composition B material was used as a filler in obtaining the plotted data. Likewise, a filler having composition D was used in obtaining the data plotted in FIG. 2. Finally, the data plotted in FIG. 3 was obtained using compositions D and E fillers.

Seals were made between either two pieces of soda lime glass, or a piece of glass and a Ni-Fe-Al alloy having a matching CTE. The glass was 3 mm thick window glass cut into inch squares. The glass was core drilled if the seal was to be leak tested.

The parts to be sealed were heated to a sealing temperature of about 310° C., for example, by being placed on a hot plate. When the parts were at sealing temperature, a layer of sealing powder was placed on the sealing surface of one part. After a half minute, the second part was placed on the sealing layer and mild pressure applied. Thereafter, the sealed member was cooled and dye checked overnight before being examined microscopically for cracks and/or porosity.

In order to test bonding of metal alloys to the soda lime glass, a strip of 0.003" metal sheet was sealed between two ⅞" square pieces of clean 3 mm thick glass. The sealed sandwich was then squared up with a diamond saw, and two horizontal slots were cut 0.250" apart. One slot extended into the seal from one side, and the other from the other side. The lap shear strength was then tested by compressing the assembly and measuring the force when failure occurred. Seals were made between each of three different alloys and the glass of Example 1 in TABLE I with 28.6% by weight Invar powder added. The results were as follows:

1. Iron nickel alloy with no oxidation No bond strength
2. Iron-nickel alloy with oxidation 3441 psi & 3219 psi
3. Iron-nickel-aluminum alloy 4124 psi & 5322 psi The seal bonded very well to both the metal and the soda lime glass for foils #2 and #3.

Seal tests were run on the following two sealing mixtures which indicated low stress values when sealed with soda lime glass. The oxyfluoride glass employed was glass 1 of TABLE II.

| | |
|---|---|
| 10 gms glass #1 | 10 gms glass #1 |
| 3.5 gms 3PbO.$P_2O_5$ | 1.0 gm Ex. A |
| 2 gms Invar | 2.0 gms Invar |
| 1 gm SnO | 1.5 gms SnO |

Both seals showed no leaks under high vacuum. These could be considered hermetic seals, and would also be suitable for very low stress seals at less than 315° C. seal temperature. This represents a minimum expansion value with the lead pyrophosphate filler.

To make parts for stress measurement, a clean glass part with polished edges was heated to 310° C. The powdered mixture was placed on the glass for 30 seconds, and then smoothed to a 0.003" thick coating. The coated glass was then removed from the hot plate and cooled. The stress was measured on a polariscope by conventional means.

We claim:

1. A fusion sealing material composed of a tin-phosphorus oxyfluoride glass having a low transition temperature and a mill addition selected from the group consisting of Invar, molybdenum, tungsten, lead orthophosphate, magnesium pyrophosphate, a magnesium pyrophosphate with at least a portion of the magnesium ions replaced by at least one cation selected from the group composed of cobalt, arsenic, zinc, iron, aluminum and zirconium, and a crystallized phosphate glass composed essentially of $P_2O_5$ and one or more cations selected from the group composed of magnesium, cobalt, arsenic, zinc, iron, aluminum and zirconium.

2. A sealing material in accordance with claim 1 wherein the tin-phosphorus oxyfluoride glass composition, in weight percent on an elemental basis, comprises 20–85% Sn, 2–20% P, 3–20% O and 10–36% F, the Sn+P+O+F total being at least 75%.

3. A sealing material in accordance with claim 1 wherein the tin-phosphorus oxyfluoride glass composition includes up to 11% Nb.

4. A sealing material in accordance with claim 1 wherein the tin-phosphorus oxyfluoride glass composition includes up to 10%, taken individually or in combination, of Mo, Fe and/or V.

5. A sealing material in accordance with claim 1 wherein the selected mill addition is Invar.

6. A sealing material in accordance with claim 1 wherein the selected mill addition is magnesium pyrophosphate.

7. A sealing material in accordance with claim 1 wherein the selected mill addition is magnesium pyrophosphate with at least a portion of the magnesium cations replaced by at least one cation selected from the group composed of cobalt, arsenic, zinc, iron, aluminum and zirconium.

8. A sealing material in accordance with claim 7 wherein the replacing cation in the magnesium pyrophosphate is cobalt.

9. A sealing material in accordance with claim 7 wherein the replacing cation in the magnesium pyrophosphate is zinc.

10. A sealing material in accordance with claim 1 wherein the selected mill addition is composed of at least two different pyrophosphate crystalline materials with at least one being a magnesium pyrophosphate with at least a portion of the magnesium cations being replaced by at least one cation selected from the group composed of cobalt, arsenic, zinc, iron, aluminum and zirconium.

11. A sealing material in accordance with claim 10 wherein one of the crystalline materials is magnesium pyrophosphate.

12. A sealing material in accordance with claim 1 wherein the selected mill addition is a phosphate selected from the group composed of lead orthophosphate, magnesium pyrophosphate, a magnesium pyrophosphate with at least a portion of the magnesium ions replaced by at least one cation selected from the group composed of cobalt, arsenic, zinc, iron, aluminum and zirconium, and a crystallized phosphate glass composed essentially of $P_2O_5$ and one or more cations selected from the group composed of magnesium, cobalt, arsenic, zinc, iron, aluminum and zirconium and the material additionally contains Invar particles.

13. A sealing material in accordance with claim 1 wherein the mill addition constitutes not more than about 20% by volume of the material.

14. A sealing material in accordance with claim 1 wherein the material contains an additional additive selected from the oxides of lead, bismuth, antimony, zinc, cadmium and stannous tin in an amount at least sufficient to reduce bubble formation in the seal.

15. A sealing material in accordance with claim 14 wherein the selected oxide is stannous oxide.

16. A sealing material in accordance with claim 1 wherein the selected mill addition is a crystallized phosphate glass composed essentially of $P_2O_5$ and one or more cations selected from the group composed of magnesium, cobalt, arsenic, zinc, iron, aluminum and zirconium.

17. A sealing material in accordance with claim 16 wherein the mill addition is a crystallized glass composed essentially of MgO and $P_2O_5$ in about the stoichiometric molar ratio of magnesium pyrophosphate.

18. A sealing material in accordance with claim 17 wherein the crystallized glass composition further includes at least one oxide selected from the group composed of cobalt, arsenic, zinc, aluminum, iron and zirconium, and the molar ratio of the total of such selected oxide(s) plus MgO to the $P_2O_5$ is about the stoichiometric molar ratio of magnesium pyrophosphate.

19. A sealing material in accordance with claim 18 wherein the selected oxide is cobalt.

20. A sealing material in accordance with claim 18 wherein the selected oxide is zinc.

21. A fusion seal composed of a tin-phosphorus oxyfluoride glass having a sealing temperature not over about 350° C. and a mill addition that is relatively inert to the oxyfluoride glass and that is dispersed therein, the mill addition being selected from the group composed of Invar, molybdenum, tungsten, lead orthophosphate magnesium pyrophosphate, a magnesium pyrophosphate with at least a portion of the magnesium ions replaced by at least one cation selected from the group composed of cobalt, arsenic, zinc, iron, aluminum and zirconium and a crystallized phosphate glass composed essentially of $P_2O_5$ and one or more cations selected from the group composed of magnesium, cobalt, arsenic, zinc, iron, aluminum and zirconium.

22. A fusion seal in accordance with claim 21 wherein the oxyfluoride sealing glass comprises 20-85% Sn, 2-20% P, 3-20 % O and 10-36% F, the total Sn+P+O+F being at least 75%.

23. A fusion seal in accordance with claim 21 wherein the oxyfluoride glass composition contains up to 11% Nb.

24. A fusion seal in accordance with claim 21 wherein the oxyfluoride glass composition contains up to 10%, taken individually or in combination, of Mo, Fe and/or V.

25. A fusion seal in accordance with claim 21 wherein the mill addition constitutes not more than 20% by volume of the seal.

26. A fusion seal in accordance with claim 21 wherein the selected mill addition is Invar.

27. A fusion seal in accordance with claim 21 wherein the selected mill addition is magnesium pyrophosphate.

28. A fusion seal in accordance with claim 21 wherein the selected mill addition is magnesium pyrophosphate with at least a portion of the magnesium cations replaced by at least one cation selected from the group composed of cobalt, arsenic, zinc, iron, aluminum and zirconium.

29. A fusion seal in accordance with claim 28 wherein the replacing cation in the magnesium pyrophosphate is cobalt.

30. A fusion seal in accordance with claim 28 wherein the replacing cation in the magnesium pyrophosphate is zinc.

31. A fusion seal in accordance with claim 21 wherein the selected mill addition is composed of at least two different pyrophosphate crystalline materials with at least one being a magnesium pyrophosphate with at least a portion of the magnesium cations being replaced by at least one cation selected from the group composed of cobalt, arsenic, zinc, iron, aluminum and zirconium.

32. A fusion seal in accordance with claim 31 wherein one of the crystalline materials is magnesium pyrophosphate.

33. A fusion seal in accordance with claim 21 wherein the selected mill addition is a phosphate selected from the group composed of lead orthophosphate, magnesium pyrophosphate, a magnesium pyrophosphate with at least a portion of the magnesium ions replaced by at least one cation selected from the group composed of cobalt, arsenic, zinc, iron, aluminum and zirconium, and a crystallized phosphate glass composed essentially of $P_2O_5$ and one or more cations selected from the group composed of magnesium, cobalt, arsenic, zinc, iron, aluminum and zirconium and the material additionally contains Invar particles.

34. A fusion seal in accordance with claim 21 wherein the mill addition further contains an oxide selected from the oxides of lead, bismuth, antimony, zinc, cadmium and stannous tin in an amount at least sufficient to reduce bubble formation in the seal.

35. A fusion seal in accordance with claim 34 wherein the selected oxide is stannous oxide.

36. A fusion seal in accordance with claim 21 wherein the selected mill addition is a crystallized phosphate glass composed essentially of $P_2O_5$ and one or more cations selected from the group composed of magnesium, cobalt, arsenic, zinc, iron, aluminum and zirconium.

37. A fusion seal in accordance with claim 36 wherein the mill addition is a crystallized glass composed essentially of MgO and $P_2O_5$ in about the stoichiometric molar ratio of magnesium pyrophosphate.

38. A fusion seal in accordance with claim 37 wherein the crystallized glass composition additionally contains at least one oxide selected from the group composed of cobalt, arsenic, zinc, aluminum, iron and zirconium, and the molar ratio of the total of such selected oxide(s) plus MgO to the $P_2O_5$ is about the stoichiometric molar ratio of magnesium pyrophosphate.

39. A fusion seal in accordance with claim 38 wherein the selected oxide is cobalt.

40. A fusion seal in accordance with claim 38 wherein the selected oxide is zinc.

41. A glass comprising, in weight percent on an elemental basis as calculated from the batch 20-85% Sn, 2-20% P, up to 11% Nb, 3-20% O, 10-36% F, the total Sn+P+Nb+O+F being at least 75%, the glass having a Tg not over 250° C. and a CTE not over $150 \times 10^{-7}/+C$.

42. A glass in accordance with claim 41 wherein the composition additionally contains up to 10%, taken individually or in combination, of Mo, Fe and/or V.

43. A glass in acordance with claim 41 wherein the composition additionally contains up to 20% total of cation modifiers selected in the indicated proportions from the group consisting of up to 25% Pb, up to 12% Zr, up to 3% Ti, up to 1% Ca, up to 3% Ba, up to 2% Zn, up to 10% Fe, the Ti+Ca+Ba+Zn+Fe being up to 10%, up to 4% Al, up to 1% Si and up to up to 3% Na+Li+K.

44. A glass in accordance with claim 41 comprising 50-75% Sn, 2-11% P, 2-10% Nb, 4-13% O, and 14-25% F.

45. A glass in accordance with claim 41 wherein the composition additionally contains 10%, taken individually or in combination, of Mo, Fe and/or V.

* * * * *